United States Patent
Gong et al.

(10) Patent No.: US 12,333,682 B2
(45) Date of Patent: Jun. 17, 2025

(54) PHOTOREALISTIC IMAGE COLOR STYLE TRANSFER COMPRESSION

(71) Applicant: Apple Inc., Cupertino, CA (US)

(72) Inventors: Han Gong, Norwich (GB); Alex Hayes, Ely (GB)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 18/164,866

(22) Filed: Feb. 6, 2023

(65) Prior Publication Data

US 2024/0265499 A1     Aug. 8, 2024

(51) Int. Cl.
   *G06T 5/50*     (2006.01)
   *G06T 3/40*     (2024.01)
   *G06T 7/90*     (2017.01)

(52) U.S. Cl.
   CPC ............... *G06T 5/50* (2013.01); *G06T 3/40* (2013.01); *G06T 7/90* (2017.01); *G06T 2207/10024* (2013.01); *G06T 2207/20081* (2013.01); *G06T 2207/20084* (2013.01)

(58) Field of Classification Search
   CPC .... G06T 5/50; G06T 7/90; G06T 3/40; G06T 2207/10024; G06T 2207/20081; G06T 2207/20084
   See application file for complete search history.

(56) References Cited

U.S. PATENT DOCUMENTS

2021/0201071 A1* 7/2021 Liao ................. G06T 11/001
2021/0374925 A1* 12/2021 Finlayson ............ G06V 10/803

FOREIGN PATENT DOCUMENTS

EP      2467823 A1    2/2018
WO   2020099893 A1    5/2020

OTHER PUBLICATIONS

Pitie, et al., "The linear Monge-Kantorovitch linear colour mapping for example-based colour transfer" (2007) In 4th IEEE European Conference on Visual Media Production (CVMP'07). London, November, 9 pages.

* cited by examiner

*Primary Examiner* — Quang N Vo
(74) *Attorney, Agent, or Firm* — Blank Rome LLP (57) ABSTRACT

Existing digital image color style transfer encoding methods are often forced to compromise between performing artifact-free local image processing and performing sufficiently expressive global image processing. Moreover, such existing image style encoding methods may be under-constrained (thereby producing more visible artifacts in stylized output images than would be desired) or over-constrained (and thereby not being expressive enough to sufficiently learn and reproduce local/spatial color changes in the stylized output images). Thus, disclosed herein are techniques to combine the advantageous aspects of existing image stylization methods in a novel hybrid image processing method that effectively bifurcates the learning and reproduction of pixel luminance changes from the learning and reproduction of pixel color changes in stylized output images. Such techniques may also advantageously capture local color changes without introducing excessive compression artifacts in the generated stylized output images—while still performing the color style transfer image processing operations in a computationally-efficient fashion.

20 Claims, 5 Drawing Sheets

PHOTOREALISTIC IMAGE COLOR STYLE TRANSFER COMPRESSION

TECHNICAL FIELD

This disclosure relates generally to the field of digital image processing. More particularly, but not by way of limitation, it relates to techniques for generating enhanced digital output images by creating compressed representations of image color styles to be applied to digital input images. In certain cases, the present inventions may also be extended to digital video image enhancement.

BACKGROUND

A digital image can be represented as a scalar function of brightness intensity, e.g., $I(x,y)$, wherein x and y are Cartesian coordinates of pixels in the image, and I is a brightness intensity value coded by a digital count. A digital image can also be represented as a vector function, $I(x,y)$, wherein I is a vector of respective intensity values for each of a plurality of different color channels, e.g., Red, Green, and Blue color channels, at particular spatial locations in the image. It will be appreciated that other coordinate systems may also be used and that digital images can also be represented by other pixel intensity encoding models, e.g., the CMYK representation that is commonly used in printing.

The exemplary function, $I(x,y)$, introduced above may be defined over any domain and may encode pixel intensities (e.g., brightness values) in different units, such as linear and logarithmic encodings. Image enhancement may be done in many ways. Image enhancement is generally achieved by manipulating (e.g., via computational processing) the image's pixel values with the intention of improving the image in some way. In some cases, this may result in the image's pixel intensities being manipulated, e.g., by equalizing brightness intensity levels or changing the intensity of pixel values in individual color channels. In other cases, the content of the image itself may be manipulated, such as to change an image's background, remove unwanted elements, or add or otherwise manipulate particular elements in the image. The actual improvement and/or enhancement that is applied to a digital image will vary depending on the particular application or use case. For example, in some use cases, producing an aesthetically pleasing image is the main goal of the image enhancement process. In other cases, the applications of image enhancement techniques may include: reproducing as many image details as possible; maximizing the image's contrast; or changing particular parts of the image, etc.

The discussions below focus on two different technical areas: image pixel intensity manipulation and image content manipulation. In the case of image pixel intensity manipulation, the intention is to substantially preserve the content of the image while manipulating intensity levels of pixels to achieve a desired effect. It will be appreciated that intensity, as used herein, may refer to the intensity of greyscale values or the intensity of one or more color channels (e.g., Red, Green, and Blue). In the case of image content manipulation, the image may be changed in a way that is dependent on the content (and may result in a change in content)—typically by replacement or manipulation of selected pixels or pixel groupings in the image that correspond with certain content areas. It should be noted that intensity and content manipulation are not mutually exclusive. For example, content manipulation may include elements of intensity manipulation, such that the added content fits in context with the rest of the image and does not look out of place.

According to some implementations, the initial stage of image enhancement in terms of both intensity manipulation and content manipulation is to select the image components or regions that are to be manipulated. In the case of image intensity manipulation, this may be done algorithmically, e.g., with fixed parameters. One such approach is based on image segmentation, in which a digital image is partitioned into multiple segments (i.e., sets of pixels). Image segmentation may, e.g., be based upon intensity, clustering, edge detection, semantic content, or other approaches (or combinations of approaches). Once an image is segmented, the image can be further manipulated, e.g., pixels may be segmented according to a threshold intensity and then those pixels with an intensity value below the threshold may be selectively lightened.

In the case of image content manipulation, segmentation may be done separately from the actual image manipulation. Image segmentation techniques are typically used to define a mask that guides the selection of pixels to be manipulated. For example, in the case of image background removal/replacement, a mask may be created that delineates the edges of the foreground to be preserved and the pixels of the remainder, i.e., the background, can then be removed, replaced, etc. Often, there may not be clear color/intensity delineation between foreground and background segments of digital images. Details such as hair and shadows are considered particularly challenging to accurately capture within a background segmentation mask. It is not unusual for photographers to have to refine computer-generated masks and pick out the details missed by the computer when generating the background mask, while some of the content manipulation embodiments set out below are able to perform a similar role automatically. In the case of image intensity manipulation, image segmentation may also be important for accuracy in certain approaches (although not all intensity manipulation approaches will need to use image segmentation).

Many existing image processing methods can be seen as a compromise between performing local/spatial image processing (i.e., where the enhancement applied is dependent on a pixel's x- and y-location within the image) and global image processing (i.e., wherein the enhancement is based on a pixel's intensity values and is independent of its x- and y-location within the image). Moreover, existing image processing methods may be under-constrained (thereby producing more visible artifacts in enhanced output images) or over-constrained (and thereby not being expressive enough to sufficiently learn and reproduce local/spatial color changes in the stylized images).

Thus, there is a need for methods, apparatuses, non-transitory computer readable media, and systems to improve upon various aspects of existing image enhancement methods.

SUMMARY

Methods, apparatuses, non-transitory computer readable media, and systems are disclosed herein to provide for the implementation of a photorealistic image color style transfer compression algorithm that is able to approximate the color style changes from a source image to a target image into a compact numerical representation (hereinafter, "Algorithm" or "Algorithms"). The encoded color style transfer may then be reapplied to an image in a different resolution and/or with similar content, or it may be stored for reapplication at a later time.

According to some embodiments disclosed herein, there is provided an image enhancement method comprising: receiving an input image and target image pair, wherein each of the input image and target image comprises data representing pixel luminance and data representing pixel color, and wherein each of the input image and target image have a first resolution (e.g., a thumbnail resolution); processing the input image data representing pixel luminance to determine a plurality of basis functions, wherein each basis function is determined based, at least in part, on a content of the input image; determining a combination of the basis functions to modify the data representing pixel luminance of the input image to approximate the data representing pixel luminance of the target image; applying the plurality of basis functions to a version of the input image having a second resolution (e.g., a full resolution) to produce a luminance-corrected approximation of the target image having the second resolution, wherein the second resolution is larger than the first resolution; learning a color similarity transform to match the data representing pixel color of the input image to the data representing pixel color of the target image; and applying the learned color similarity transform (e.g., a three-dimensional global color similarity transformation) to the luminance-corrected approximation of the target image to generate an output image having the second resolution.

According to other embodiments, the step of processing the input image data representing pixel luminance to determine the plurality of basis functions comprises processing derivatives of the input image data representing pixel luminance to determine the plurality of basis functions.

According to other embodiments, each of the plurality of basis functions, when applied to the version of the input image having the second resolution, decomposes the version of the input image having the second resolution into a corresponding image layer by encoding each pixel of the version of the input image having the second resolution according to the respective basis function.

According to other embodiments, the target image comprises an output of a predetermined image processing algorithm (e.g., a neural style transfer algorithm), and the step of determining a combination of the basis functions includes solving an optimization for combining the basis functions to approximate the output of the predetermined image processing algorithm.

According to other embodiments, learning the color similarity transform further comprises learning the color similarity transform to match a luminance-aligned version of the data representing pixel color of the input image to the data representing pixel color of the target image.

According to other embodiments, applying the learned color similarity transform further comprises applying a weighted combination of two or more learned global color transformations to the luminance-corrected approximation of the target image.

According to still other embodiments, the method may further comprise applying a highlight correction operation to reduce a saturation level of the output image.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image enhancement systems and devices are also disclosed herein, in accordance with the various method and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

The photorealistic image color style transfer compression Algorithms described herein may also be able to preserve the photorealism of input images and prevent image compression artifacts that are typically caused by the use of rendered inputs (e.g., JPEG images). Such Algorithms may also be used to speed up expensive image processing operations (e.g., image color style transfer operations) by computing the numerical representation of the color style transfer at a lower the full resolution-level (e.g., a socalled "thumbnail" resolution level) and then applying the Algorithm to a full-resolution input image.

The Algorithms disclosed herein may also fix a majority of non-photorealistic or undesired color style changes that may be introduced by the original image processing algorithm. In fact, the Algorithms may be applied in the context of both still images and video image sequences for replicating image color changes made by trained "image stylization" neural networks.

The Algorithms described herein leverage techniques disclosed in: the commonly-assigned U.S. Pat. No. 9,424,231 (hereinafter, "the '231 patent"); the commonly-assigned and co-pending U.S. Patent Publication No. 2021/0374925

(hereinafter, "the '925 publication"); and in the following paper: F. Pitie and A. Kokaram, "The linear Monge-Kantorovitch linear colour mapping for example-based colour transfer," 4th European Conference on Visual Media Production, 2007, pp. 1-9, doi: 10.1049/cp: 20070055 (hereinafter, "MK"). The '231 patent, '925 publication, and MK paper are each hereby incorporated by reference in their entireties.

The '231 patent and '925 publication describe image processing methods for approximating color changes applied to digital images by image stylization operations using RGB polynomial color mapping, as well as for utilizing spatial weight maps for blending multiple polynomial color mappings to encode local color changes. The techniques of the '231 patent and '925 publication can encode complicated color changes but are generally unconstrained-and thus may reproduce unwanted image artifacts that were produced by the target image processing algorithm and/or make compression artifacts more visible in the stylized output images.

MK describes a method that encodes a global color change between two images by determining an optimal 3D color similarity transform in RGB color space. MK preserves intensity change monotonicity in the original image (i.e., the relative intensity order between a pixel A and a pixel B in the input image is preserved, as much as possible, in the output image) and is therefore more resistant to image compression artifacts. However, MK is often not expressive enough to sufficiently capture local color changes imparted by the color style transform.

Thus, disclosed herein are techniques to combine the advantageous aspects of existing image stylization methods in a novel hybrid image processing method that effectively bifurcates the learning and reproduction of pixel luma changes from the learning and reproduction of pixel color changes in stylized output images. (Note: While the term "luma" technically refers to gamma-corrected luminance values, the terms "luma" and "luminance" may be used interchangeably herein, for convenience and ease of illustration.) Such techniques may also advantageously capture local color changes without introducing excessive compression artifacts in the generated stylized output images—while still storing and performing the color style transfer image processing operations in a computationally-efficient fashion.

Figure 1:
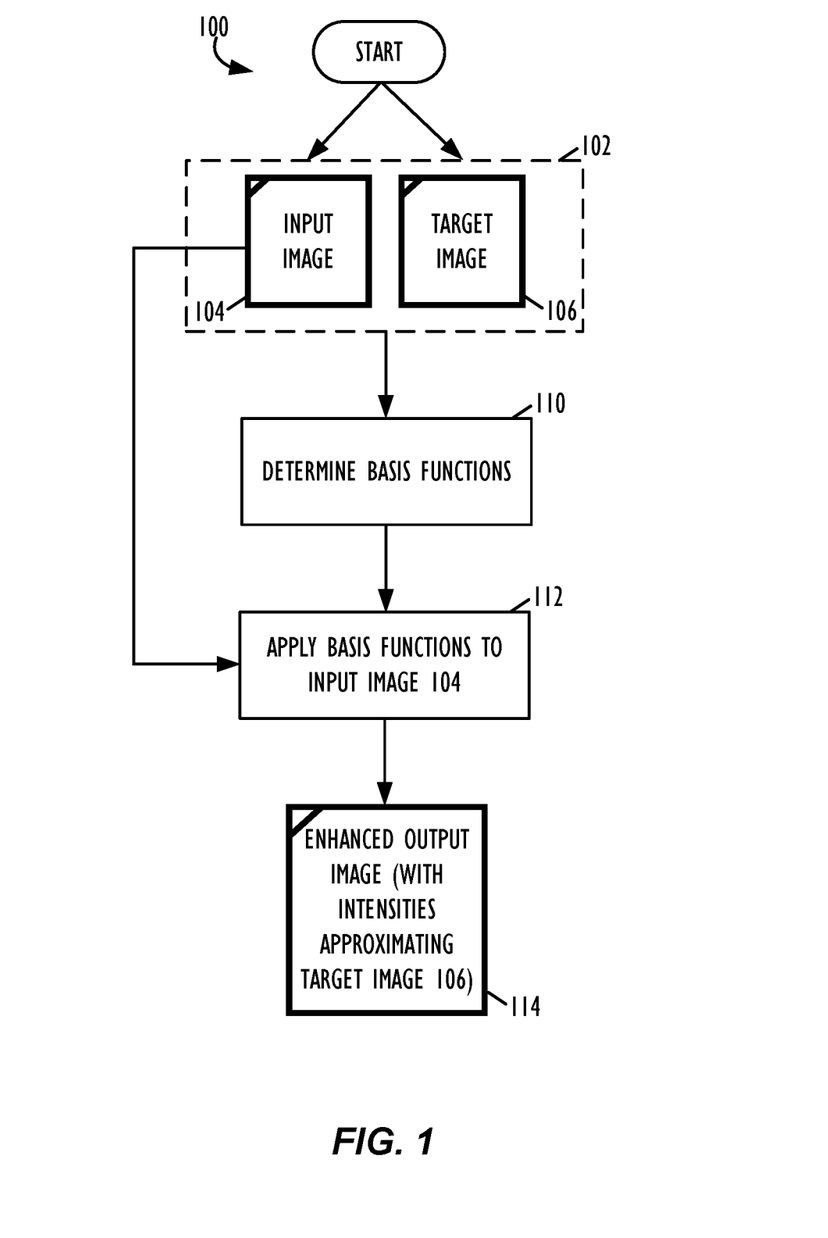
FIG. 1 illustrates an example of a method of performing image luminance enhancement utilizing content-based basis functions, according to various embodiments.

Exemplary Image Luminance Enhancement Methods Utilizing Content-Based Basis Functions Turning now to FIG. 1, an example of a method 100 of performing image luminance enhancement utilizing content-based basis functions is shown, according to various embodiments. In step 102, data representing pixel intensities of an input image 104 and a target image 106 is received. In step 110, the data is processed to determine a plurality of basis functions (e.g., as described with reference to the '925 publication). The plurality of basis functions are then selected, calculated, derived or otherwise determined per image and based on the content in the image itself. Each basis function may be configured to modify the intensity of pixels of the input image 104 to approximate the target image 106.

In step 112, the plurality of basis functions from step 110 may be applied to the input image to produce an approximation of the target image (also referred to herein as an "enhanced image" or "output image"). The enhanced output image 114 may then be written to storage, output to a display, communicated, or otherwise output-depending on the intended application for the image data.

Figure 2:
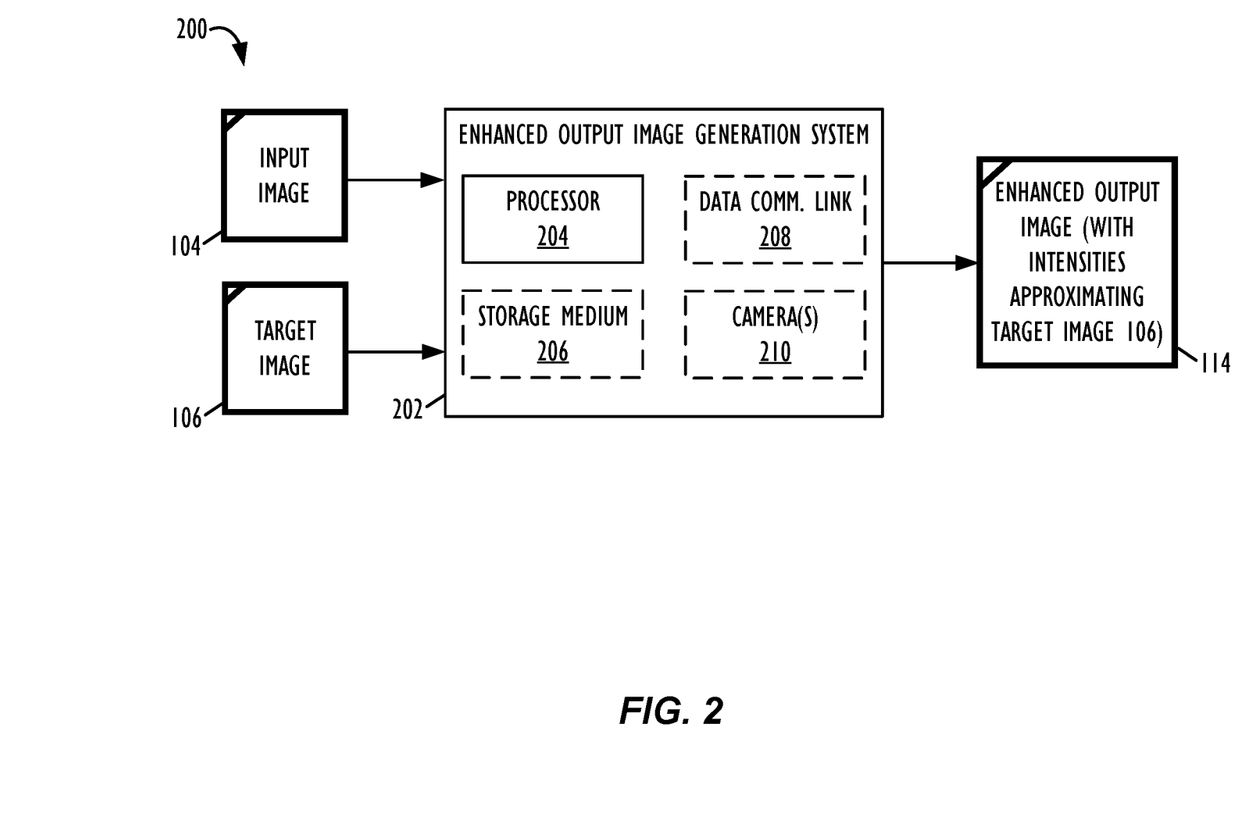
FIG. 2 illustrates an example of a system for performing image luminance enhancement utilizing content-based basis functions, according to various embodiments.

Exemplary System for Image Luminance Enhancement Utilizing Content-based Basis Functions Turning now to FIG. 2, an example 200 of a system 202 for performing image luminance enhancement utilizing content-based basis functions is shown, according to various embodiments. The input image 104 may be received at the enhanced output image generation system 202 via a data communications link 208 or on a storage medium 206, or it may be obtained directly as an image feed from cameras 210, etc. The input image 104 may be grayscale, color, or multi-spectral and may also be logically composed of a number of images (e.g., separately encoded or stored images) of the same scene, components of a single or related image feeds, components of a single or related image file, etc. The target image 106 may also be received at system 202 via a data communications link 208 or other desired modality. Alternatively, the target image 106 could be generated by a further system that is provided with the input image and then applies some predetermined process or algorithm to it. In this case, it is "received" in the sense that it is received from the further system that generates it from the input image. In such an arrangement, the input image may be the only user input.

The system 202 may also include a processor 204 that obtains data representing pixel intensities of the input image 104 and target image 106. Different intensities can be processed depending on the encoding and desired image processing application. For example, the processing may be performed on pixel brightness levels, or the processing may be performed only on the intensity of a specific color (or other spectral) channel. The processing may also operate on derivatives of the image pixel data. As described above, the processor 204 may process the data to determine a plurality basis functions. The basis functions may be determined per image and may be determined based, at least in part, on the content of the input image itself (and optionally the content of the target image).

Each of the plurality of basis functions, when applied to the input image 104, decomposes the input image into a corresponding image layer by encoding each pixel according to its intensity. Each basis function may be applied across the entirety of the input image. Once the basis functions have been obtained, they are applied to the input image 104, and the resultant image layers are combined to generate an intensity modified, i.e., enhanced, output image 114 that is an approximation of the target image 106.

Exemplary Image Enhancement Pipeline for Photorealistic Image Color Style Transfer Compression Because the human vision system (HVS) is potentially more sensitive to high frequency luminance changes, the image enhancement pipeline embodiments disclosed herein have adopted techniques similar to those described in the '925 publication for encoding local luminance changes in images. However, in order to avoid excessive chroma (i.e., color-based) artifacts, a modified version of the MK algorithm is then used for encoding the remaining color changes that are required to match the luminance-corrected input image as closely as possible to the target image. Thus, the embodiments disclosed herein comprise the use of a hybrid image processing method that effectively bifurcates the learning and reproduction of pixel luminance changes from the learning and reproduction of pixel color changes in stylized output images. According to some implementations, an additional highlight correction step may be employed to prevent excessive pixel saturation that may be present in the output image after the color changes.

Figure 3:
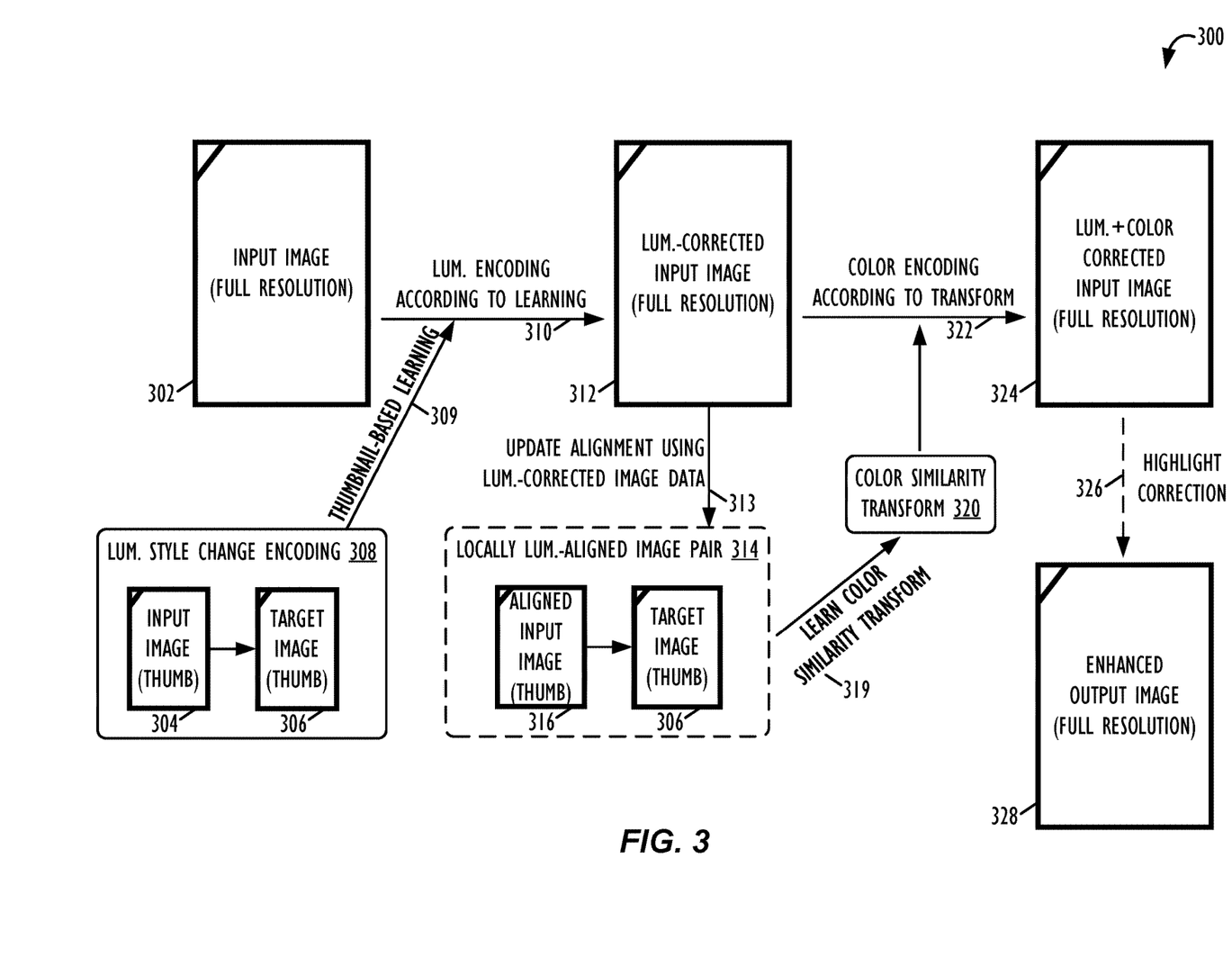
FIG. 3 illustrates an example of an improved image enhancement pipeline for photorealistic image color style transfer compression, according to various embodiments.

Turning now to FIG. 3, an example of such an improved image enhancement pipeline 300 for photorealistic image color style transfer compression is illustrated and will now be summarized at a high level. As described above, at block 308, techniques similar to those described in the '925 publication may be used to encode the local luminance changes imparted by the desired image style by learning on a thumbnail version of the input image (i.e., an image having a resolution less than full image resolution) 304 and a thumbnail version of the target image 306. The thumbnail-based learnings 309 of the luminance encoding process may then be applied at 310 to a full resolution version of the input image 302, thereby resulting in a luminance-corrected full resolution version of the input image 312.

According to some embodiments, the luminance-corrected full resolution version of the input image 312 may be used 313 to update the alignment of the input image thumbnail at block 314, wherein a luminance-corrected version of the input image thumbnail 316 may be compared to the thumbnail version of the target image 306. The aligned luminance-corrected version of the input image thumbnail 316 and the thumbnail version of the target image 306 may then be used at 319, e.g., by an MK algorithm process, to learn one or more color similarity transforms, e.g., global color transformation(s) 320, that would transform the color of the pixels in image 316 to match the color of the pixels in image 306 as closely as possible.

Next, the learned color transformation(s) 320 may be applied to the luminance-corrected full resolution version of the input image 312 at step 322, in order to produce a full resolution, luminance-corrected and color-corrected version of the input image 324. According to some implementations, and as will be explained in further detail below, a highlight correction operation 326 may also optionally be applied to image 324 to generate the final, full resolution enhanced output image 328 that is not undesirably over-saturated. Additional details regarding the improved image enhancement pipeline 300 introduced here will now be discussed below.

The term luminance, as used herein, may also be defined as the mean value of the Red, Green, and Blue color channel intensity values of a pixel. According to some embodiments, the luminance values, L(x,y), may be expanded to their second order polynomial, represented as $\underline{L}(x,y)$, wherein:

$$\underline{L}(x, y) = [L(x, y)\ L^2(x, y)],\qquad \text{(Eqn. 1)}$$

and wherein (x,y) are image coordinates.

Supposing that there are k spatial weight maps, the adjusted luminance, L'(x,y), can be computed as:

$$L'(x, y) = \sum_i w_i(x, y)\underline{L}(x, y)\underline{c}_i,\qquad \text{(Eqn. 2)}$$

where $w_i(x,y)$ is a spatial weight map, and $\underline{c}_i$ is a set of polynomial coefficients for a luminance mapping. According to some implementations, a value of k=four (4) weight maps may be used, which are associated with four different polynomial luminance mappings. Each spatial weight map may thus encode the degree that each luminance mapping applies to every local pixel. To generate the weight maps, $w_i$, the pixels may first be divided according to their logarithmic intensity levels. These levels may be computed using quantiles. For each logarithmic intensity level, a spatial map may be created using a non-linear function that is applied to all the intensities of a level. These maps may then be normalized and/or filtered (e.g., using a bilateral filter) to remove high-frequency information (e.g., texture or noise).

As described above, according to some implementations, the MK algorithm (or other similar global color transform learning algorithms) may be used in the pipeline for the color change encoding step. Supposing that a luminance-corrected 3×N image RGB intensity matrix, A, and its target image intensity matrix, B, have been computed (where N is the number of pixels), a 3×3 transform matrix, T, may be solved for, such that:

$$T\sum\nolimits_A T^\top = \sum\nolimits_B,\qquad \text{(Eqn. 3)}$$

wherein $\Sigma_A$ and $\Sigma_B$ indicate the covariances of A and B, respectively. As indicated in Eqn. 3, there are numerous solutions for T. The MK solution is one unique constrained solution that minimizes the RGB intensity displacements. The MK solution gives:

$$T = \sum\nolimits_A^{-1/2}\bigl(\sum\nolimits_A^{1/2}\sum\nolimits_B\sum\nolimits_A^{1/2}\bigr)^{1/2}\sum\nolimits_A^{-1/2}.\qquad \text{(Eqn. 4)}$$

The MK solution explicitly assumes that the RGB intensity distribution is a set of multivariate Gaussian distributions (MVG). With an estimated T, the encoded color changes may be reapplied to get the output RGBs as the follows:

$$A' = T(A - \hat{A}1_{3\times N}) + \hat{B}1_{3\times N},\qquad \text{(Eqn. 5)}$$

where $\hat{A}$ and $\hat{B}$ are the mean RGB intensities of all the pixels, and $1_{3\times N}$ is a 3×N matrix of ones. Effectively, Eqn. 5 can be rearranged as a single 3D global image color similarity transform.

Because a single MK represents a global color transformation, it may not accurately encode highly localized color style changes. Thus, according to some embodiments disclosed herein, a more generalized MK approach may be utilized, which is essentially a combination of multiple MK transforms that may be linearly (or otherwise) blended by multiple spatial weight maps. This combination enables the MK algorithm to encode more local color changes without introducing artifacts. The spatial weight maps $w_i(x,y)$ may be reused for blending between multiple MK transforms or, alternatively, new weight maps may be derived for each of the multiple MK transforms.

In some implementations, the spatial weight map $w_i(x,y)$ produced in the luminance change encoding step may be reused. It may also be normalized, $w_i(x,y)$, such that the sum of all the weights, $w_i$, equals to 1.

Each MK solution, $T_i$, may be then be solved for, which gives:

$$A' = \sum_i T_i(A_i - \hat{A}_i 1_{3\times N}) + \hat{B}_i 1_{3\times N},\qquad \text{(Eqn. 6)}$$

wherein $A_i$ and $B_i$ are, respectively, the $\underline{w}_i(x,y)$ weighted intensities. For example, the image grid form of $A_j$, denoted as $I_{A_j}$, may be computed as:

$$I_{A_i}^j(x, y) = w_i(x, y) I_A^j(x, y), \quad \text{(Eqn. 7)}$$

wherein j indicates an RGB channel.

Optional Highlight Correction

In some embodiments, an additional highlight correction step may be applied to the output image to reduce any undesirable over-saturation that may be created by luminance style and color changes applied to the input image. For example, if the intensity of a given channel, j, in an image is represented as $I^j(x, y)$, highlights may be reduced by linearly adjusting the intensity distribution range as follows:

$$J^j(x, y) = \frac{I^j(x, y) - I_{low}}{I_{high} - I_{low}}, \quad \text{(Eqn. 8)}$$

wherein $J^j(x,y)$ is the highlight corrected intensity value, $I_{high}$ is the highest intensity value of all channels (e.g., defined as the $99^{th}$ percentile of values not being greater than 1.1), and $I_{low}$ is the lowest intensity value of all channels (e.g., defined as the $1^{st}$ percentile of values not being less than 0.02).

Other Considerations

In still other implementations, it is also possible to extend the RGB terms to polynomial or (root-polynomial) terms, e.g., to encode more aggressive local color style changes.

It is also possible that intensity change monotonicity may be broken when encoding luminance style change according to the techniques disclosed herein, thereby introducing undesirable artifacts, such as JPEG banding artifacts. Thus, according to some embodiments, the use of polynomial curve fitting may be replaced, e.g., by a 1-D Look-Up-Table (LUT)-based monotonic curve fitting. This could, e.g., be solved by using quadratic programming with a non-decreasing curve constraint.

In yet other implementations, chroma subsampling-based processing may be used. In such implementations, the exemplary pipeline 300 may be modified to specifically suit JPEG format images with YCrCb subsampled data. The luminance correction process described herein could be applied to the Y channel, and the MK algorithm's color change could then be used to encode a 2-channel input, CrCb. The matrix, T, in this case would then become a 2×2 matrix.

As may now be appreciated, the techniques described herein may also have more general applications in accelerating and optimizing the other image processing operations. The potential applications may include: 1) acceleration of expensive, e.g., neural network (NN)-powered, image manipulations and artifact removal; 2) color and tonal stabilization for imperfectly-registered video frames; 3) compression of image color manipulation for cloud-based computing; and/or 4) color and tonal registration for images captured by multiple camera sensors.

Figure 4:
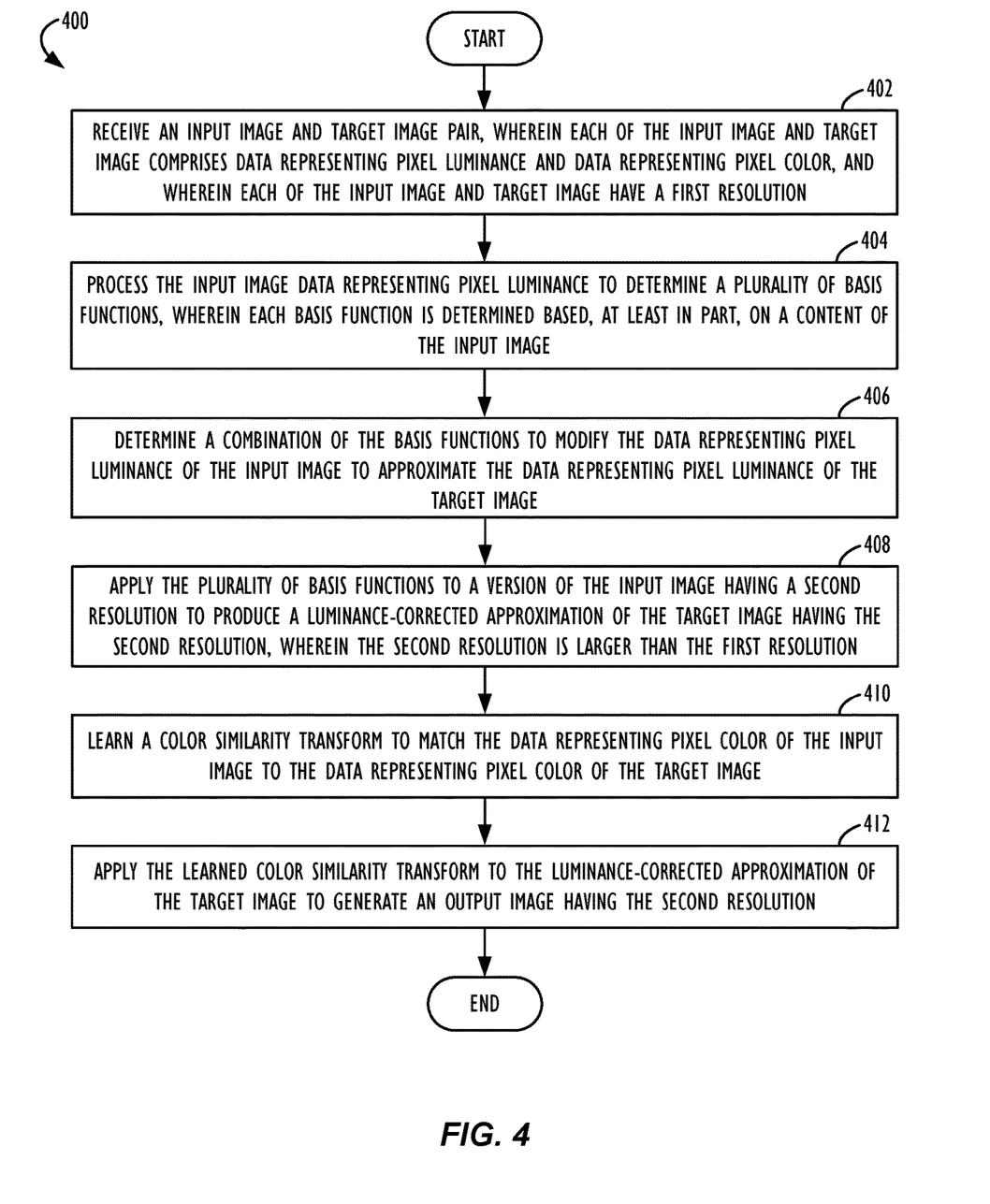
FIG. 4 is a flow chart illustrating a method of performing photorealistic image color style transfer compression, according to various embodiments.

Exemplary Method for Performing Photorealistic Image Color Style Transfer Compression FIG. 4 is a flow chart illustrating a method 400 for performing photorealistic image color style transfer compression. First, at Step 402, the method 400 may receive an input image and target image pair, wherein each of the input image and target image comprises data representing pixel luminance and data representing pixel color, and wherein each of the input image and target image have a first resolution (e.g., a thumbnail resolution, as described above). Next, at Step 404, the method 400 may process the input image data representing pixel luminance to determine a plurality of basis functions, wherein each basis function is determined based, at least in part, on a content of the input image.

Next, at Step 406, the method 400 may determine a combination of the basis functions to modify the data representing pixel luminance of the input image to approximate the data representing pixel luminance of the target image. At Step 408, the method 400 may then apply the plurality of basis functions to a version of the input image having a second resolution to produce a luminance-corrected approximation of the target image having the second resolution, wherein the second resolution is larger than the first resolution (e.g., a full resolution version of the original input image).

Next, at Step 410, the method 400 may learn a color similarity transform (e.g., involving a weighted combination of two or more color transforms learned by the MK algorithm or a similar desired global color transform determination algorithm) to match the data representing pixel color of the input image to the data representing pixel color of the target image.

Finally, at Step 412, the method 400 may apply the learned color similarity transform to the luminance-corrected approximation of the target image to generate an output image having the second resolution. As may now be appreciated, the method 400 comprises a novel, hybrid image processing method that effectively bifurcates the learning and reproduction of pixel luminance changes from the learning and reproduction of pixel color changes in stylized output images. Such techniques may also advantageously capture local color changes without introducing excessive compression artifacts in the generated stylized output images—while still performing the color style transfer image processing operations in a memory- and computationally-efficient fashion.

Exemplary Electronic Computing Devices

Figure 5:
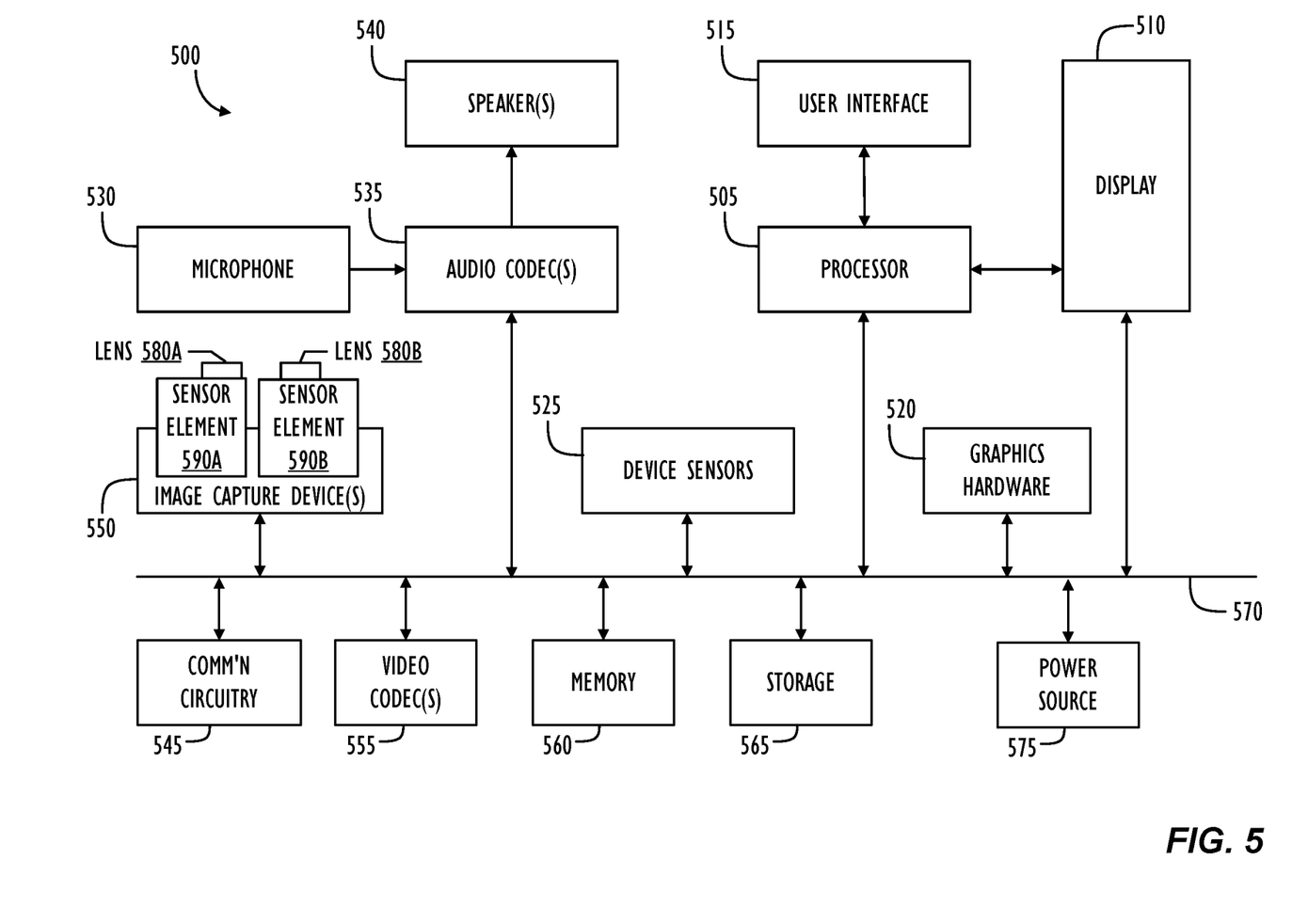
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device(s) 550, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 550 may comprise one or more camera units configured to capture images, e.g., images which may be processed for improved color style transfer, e.g., in accordance with this disclosure. Image capture device(s) 550 may include two (or more) lens assemblies 580A and 580B, where each lens assembly may have a separate focal length. For example, lens assembly 580A may have a shorter focal length relative to the focal length of lens assembly 580B. Each lens assembly may have a separate associated sensor element, e.g., sensor elements 590A/590B. Alternatively, two or more lens assemblies may share a common sensor element. Image capture device(s) 550 may capture still and/or video images. Output from image capture device(s) 550 may be processed, at least in part, by video codec(s) 555 and/or processor 505 and/or graphics hardware 520, and/or a dedicated image processing unit or image signal processor incorporated within image capture device(s) 550. Images so captured may be stored in memory 560 and/or storage 565.

Memory 560 may include one or more different types of media used by processor 505, graphics hardware 520, and image capture device(s) 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An image enhancement method comprising:
receiving an input image and target image pair, wherein each of the input image and target image comprises data representing pixel luminance and data representing pixel color, and wherein each of the input image and target image have a first resolution;
processing the input image data representing pixel luminance to determine a plurality of basis functions, wherein each basis function is determined based, at least in part, on a content of the input image;
determining a combination of the basis functions to modify the data representing pixel luminance of the input image to approximate the data representing pixel luminance of the target image;
applying the plurality of basis functions to a version of the input image having a second resolution to produce a luminance-corrected approximation of the target image having the second resolution, wherein the second resolution is larger than the first resolution;
learning a color similarity transform to match the data representing pixel color of the input image to the data representing pixel color of the target image; and
applying the learned color similarity transform to the luminance-corrected approximation of the target image to generate an output image having the second resolution.

2. The method of claim 1, wherein the step of processing the input image data representing pixel luminance to determine the plurality of basis functions comprises processing derivatives of the input image data representing pixel luminance to determine the plurality of basis functions.

3. The method of claim 1, wherein each of the plurality of basis functions, when applied to the version of the input image having the second resolution, decomposes the version of the input image having the second resolution into a corresponding image layer by encoding each pixel of the version of the input image having the second resolution according to the respective basis function.

4. The method of claim 1, wherein the target image comprises an output of a predetermined image processing algorithm, and wherein the step of determining a combination of the basis functions includes solving an optimization for combining the basis functions to approximate the output of the predetermined image processing algorithm.

5. The method of claim 4, wherein the predetermined image processing algorithm comprises a neural style transfer algorithm.

6. The method of claim 1, wherein the first resolution comprises a thumbnail version of the input image and the target image.

7. The method of claim 1, wherein learning the color similarity transform further comprises:
learning the color similarity transform to match a luminance-aligned version of the data representing pixel color of the input image to the data representing pixel color of the target image.

8. The method of claim 1, wherein applying the learned color similarity transform further comprises:
applying a three-dimensional global color similarity transformation to the luminance-corrected approximation of the target image.

9. The method of claim 1, wherein applying the learned color similarity transform further comprises:
applying a weighted combination of two or more learned global color transformations to the luminance-corrected approximation of the target image.

10. The method of claim 1, further comprising:
applying a highlight correction operation to reduce a saturation level of the output image.

11. An image enhancement system comprising:
an input interface configured to receive an input image and target image pair, wherein each of the input image and target image comprises data representing pixel luminance and data representing pixel color, and wherein each of the input image and target image have a first resolution;
a processor configured to execute computer program code for processing the input image data representing pixel luminance to determine a plurality of basis functions, wherein each basis function is determined based, at least in part, on a content of the input image;
the processor being further configured to execute computer program code to:
determine a combination of the basis functions to modify the data representing pixel luminance of the input image to approximate the data representing pixel luminance of the target image;
apply the plurality of basis functions to a version of the input image having a second resolution to produce a luminance-corrected approximation of the target image having the second resolution, wherein the second resolution is larger than the first resolution;
learn a color similarity transform to match the data representing pixel color of the input image to the data representing pixel color of the target image; and
apply the learned color similarity transform to the luminance-corrected approximation of the target image to generate an output image having the second resolution.

12. The system of claim 11, wherein the target image comprises an output of a predetermined image processing algorithm, and wherein determining a combination of the basis functions includes solving an optimization for combining the basis functions to approximate the output of the predetermined image processing algorithm.

13. The system of claim 12, wherein the predetermined image processing algorithm comprises a neural style transfer algorithm.

14. The system of claim 11, wherein the first resolution comprises a thumbnail version of the input image and the target image.

15. The system of claim 11, wherein the processor being configured to execute computer program code to learn the color similarity transform further comprises the processor being configured to execute computer program code to:
learn the color similarity transform to match a luminance-aligned version of the data representing pixel color of the input image to the data representing pixel color of the target image.

16. The system of claim 11, wherein the processor being configured to execute computer program code to apply the learned color similarity transform further comprises the processor being configured to execute computer program code to:
apply a three-dimensional global color similarity transformation to the luminance-corrected approximation of the target image.

17. The system of claim 11, wherein the processor being configured to execute computer program code to apply the learned color similarity transform further comprises the processor being configured to execute computer program code to:
apply a weighted combination of two or more learned global color transformations to the luminance-corrected approximation of the target image.

18. The system of claim 11, wherein the processor is further configured to execute computer program code to:
apply a highlight correction operation to reduce a saturation level of the output image.

19. A non-transitory program storage device, readable by one or more processors and comprising instructions stored thereon to cause the one or more processors to:
receive an input image and target image pair, wherein each of the input image and target image comprises data representing pixel luminance and data representing pixel color, and wherein each of the input image and target image have a first resolution;
process the input image data representing pixel luminance to determine a plurality of basis functions, wherein each basis function is determined based, at least in part, on a content of the input image;
determine a combination of the basis functions to modify the data representing pixel luminance of the input image to approximate the data representing pixel luminance of the target image;
apply the plurality of basis functions to a version of the input image having a second resolution to produce a luminance-corrected approximation of the target image having the second resolution, wherein the second resolution is larger than the first resolution;
learn a color similarity transform to match the data representing pixel color of the input image to the data representing pixel color of the target image; and
apply the learned color similarity transform to the luminance-corrected approximation of the target image to generate an output image having the second resolution.

20. The non-transitory program storage device of claim 19, wherein the first resolution comprises a thumbnail version of the input image and the target image, and wherein the second resolution comprises a full resolution version of the input image and the target image.

* * * * *